(12) United States Patent
Li et al.

(10) Patent No.: US 12,455,016 B2
(45) Date of Patent: Oct. 28, 2025

(54) ROUGH-IN VALVE

(71) Applicant: AS America, Inc., Piscataway, NJ (US)

(72) Inventors: Hsiao Chang Li, Edison, NJ (US); Walter Pitsch, Washington, NJ (US)

(73) Assignee: AS America, Inc., Piscataway, NJ (US)

( * ) Notice: Subject to any disclaimer, the term of this patent is extended or adjusted under 35 U.S.C. 154(b) by 196 days.

(21) Appl. No.: 18/221,008

(22) Filed: Jul. 12, 2023

(65) Prior Publication Data
US 2024/0019039 A1 Jan. 18, 2024

Related U.S. Application Data

(60) Provisional application No. 63/388,724, filed on Jul. 13, 2022.

(51) Int. Cl.
| | |
|---|---|
| *F16K 27/06* | (2006.01) |
| *F16K 11/085* | (2006.01) |
| *F16L 37/12* | (2006.01) |
| *F16L 37/53* | (2006.01) |
| *E03C 1/02* | (2006.01) |
| *E03C 1/04* | (2006.01) |
| *F16K 5/04* | (2006.01) |
| *F16K 11/00* | (2006.01) |
| *F16K 11/074* | (2006.01) |

(Continued)

(52) U.S. Cl.
CPC ........ *F16K 27/065* (2013.01); *F16K 11/0853* (2013.01); *F16L 37/1225* (2013.01); *F16L 37/53* (2013.01); *E03C 1/021* (2013.01); *E03C 1/0408* (2013.01); *F16K 5/04* (2013.01); *F16K 11/074* (2013.01); *F16K 11/0782* (2013.01); *F16K 19/006* (2013.01); *F16K 27/00* (2013.01); *Y10T 137/6011* (2015.04); *Y10T 137/86863* (2015.04); *Y10T 137/87249* (2015.04)

(58) Field of Classification Search
CPC .. F16K 27/065; F16K 11/0853; F16K 11/074; F16K 11/0782; F16K 5/04; F16K 19/006; F16K 27/00; F16L 37/1225; F16L 37/53; E03C 1/0408; E03C 1/021; Y10T 137/86863; Y10T 137/87249; Y10T 137/6011
USPC ...... 137/625.47, 15.21, 315.11, 315.12, 562, 137/597, 603, 896, 887, 801; 4/676, 678, 4/612; 251/368
See application file for complete search history.

(56) References Cited

U.S. PATENT DOCUMENTS

| | | | | |
|---|---|---|---|---|
| 3,591,130 | A | * | 7/1971 | McCarty ............. F16K 31/0679 251/129.15 |
| 5,313,985 | A | * | 5/1994 | Donner ................. D06F 39/088 137/884 |

(Continued)

*Primary Examiner* — Minh Q Le
(74) *Attorney, Agent, or Firm* — Rameshwar U. Patel; Anna-Lisa L. Gallo; Tyler A. Stevenson (57) ABSTRACT

A rough-in valve assembly comprising a valve body, wherein the valve body comprises a thermoplastic, the valve body comprises a first fluid inlet, a second fluid inlet, a first fluid outlet, and a second fluid outlet, the valve body comprises a valve chamber configured to receive a fluid mixing valve assembly, and the valve chamber is in fluid communication with the first fluid inlet, the second fluid inlet, the first fluid outlet, and the second fluid outlet. A rough-in valve body may comprise an engineering thermoplastic. A rough-in valve body may comprise an injection molded thermoplastic.

19 Claims, 5 Drawing Sheets

(51) Int. Cl.
*F16K 11/078* (2006.01)
*F16K 27/00* (2006.01)

(56) References Cited

U.S. PATENT DOCUMENTS

| | | | | |
|---|---|---|---|---|
| 5,732,729 | A * | 3/1998 | Shieh | G05D 23/1313 137/98 |
| 6,718,569 | B2 * | 4/2004 | Burger | E03C 1/023 137/359 |
| 7,819,134 | B2 * | 10/2010 | Izzy | F16K 27/00 251/288 |
| 9,845,908 | B2 * | 12/2017 | Brunella | F16L 25/14 |
| 11,203,856 | B2 | 12/2021 | Li et al. | |
| 11,662,032 | B2 * | 5/2023 | Boecker | F16K 11/0836 137/625.47 |
| 2004/0140004 | A1 * | 7/2004 | Ouyoung | F16K 43/003 4/675 |
| 2005/0200126 | A1 * | 9/2005 | Fischer | F16L 47/24 285/305 |
| 2011/0067225 | A1 * | 3/2011 | Bassaco | F16L 37/08 285/82 |
| 2012/0073686 | A1 * | 3/2012 | Yang | F16K 11/0782 137/625.4 |
| 2012/0180887 | A1 * | 7/2012 | Yan | F16K 11/0743 137/597 |
| 2012/0279595 | A1 * | 11/2012 | Huck | F16K 27/045 137/896 |
| 2014/0261747 | A1 * | 9/2014 | Bares | F16L 37/00 137/15.21 |
| 2014/0261808 | A1 * | 9/2014 | Brouwer | F16K 39/024 251/366 |
| 2017/0328042 | A1 | 11/2017 | Tzeng | |
| 2021/0332923 | A1 * | 10/2021 | Han | F16L 43/008 |
| 2021/0341077 | A1 * | 11/2021 | Williams | F16K 31/60 |
| 2021/0364098 | A1 * | 11/2021 | Tzeng | F16K 27/044 |
| 2022/0235871 | A1 * | 7/2022 | Li | E03C 1/021 |

* cited by examiner

ROUGH-IN VALVE

BACKGROUND

Most rough-in valves for shower assemblies comprise casted or forged brass metal. Brass is an alloy of copper and zinc, and often contains small amounts of lead as well for ease of machining. It is highly desirable to remove any lead from water delivery systems. Further, casted or forged brass rough-in valves require a secondary machining process to provide coupling features, for example threaded connections configured to couple to brass nipple adapters. Such coupling features may only couple to specific nipple adapters. Also desired is a rough-valve configured to couple to a variety of different adapters.

SUMMARY

A rough-in valve assembly comprising a valve body, wherein the valve body comprises a thermoplastic, the valve body comprises a first fluid inlet, a second fluid inlet, a first fluid outlet, and a second fluid outlet, the valve body comprises a valve chamber configured to receive a fluid mixing valve assembly, and the valve chamber is in fluid communication with the first fluid inlet, the second fluid inlet, the first fluid outlet, and the second fluid outlet. In some embodiments, a rough-in valve body comprises an engineering thermoplastic. In some embodiments, a rough-in valve body comprises an injection molded thermoplastic.

BRIEF DESCRIPTION OF THE DRAWINGS

This disclosure is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1A:
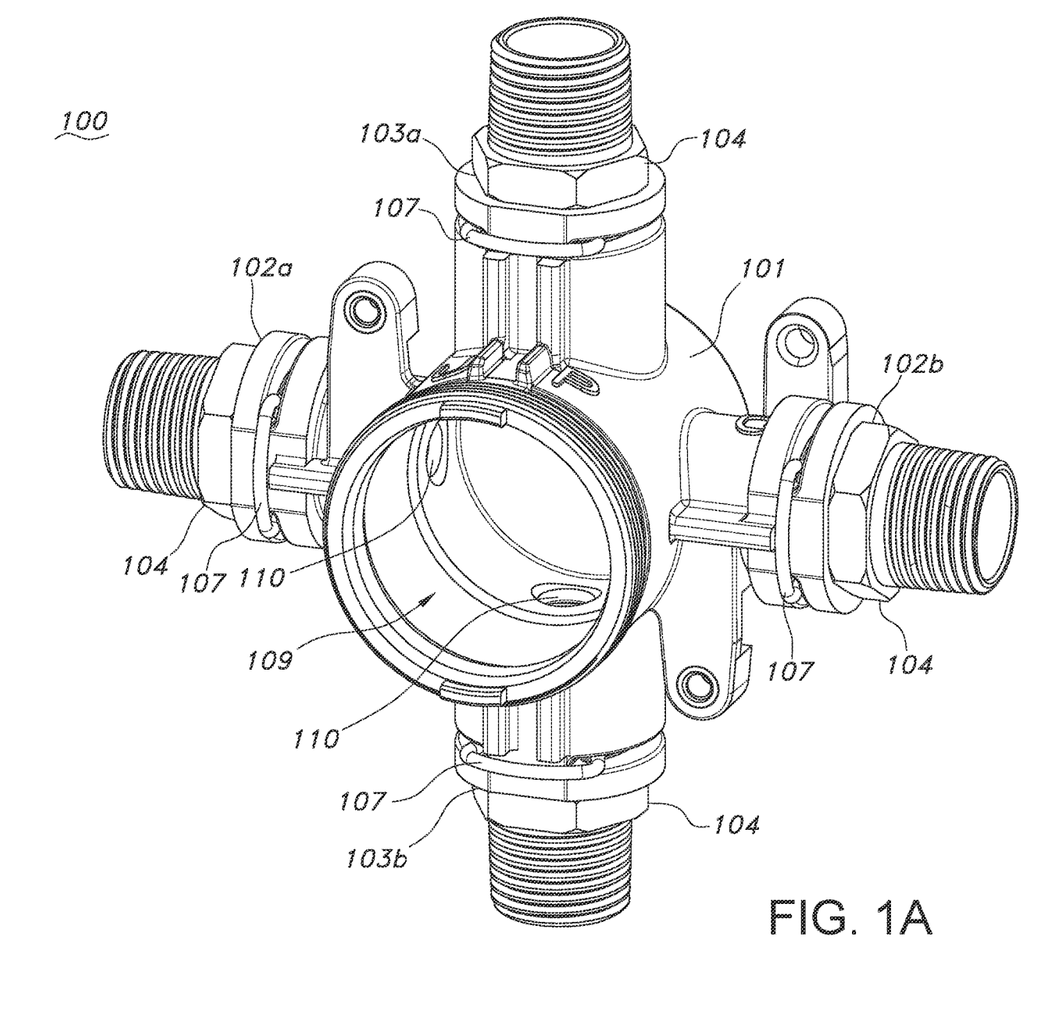
FIG. 1A and FIG. 1B provide a views of a rough-in valve assembly, according to some embodiments.
Figure 1B:
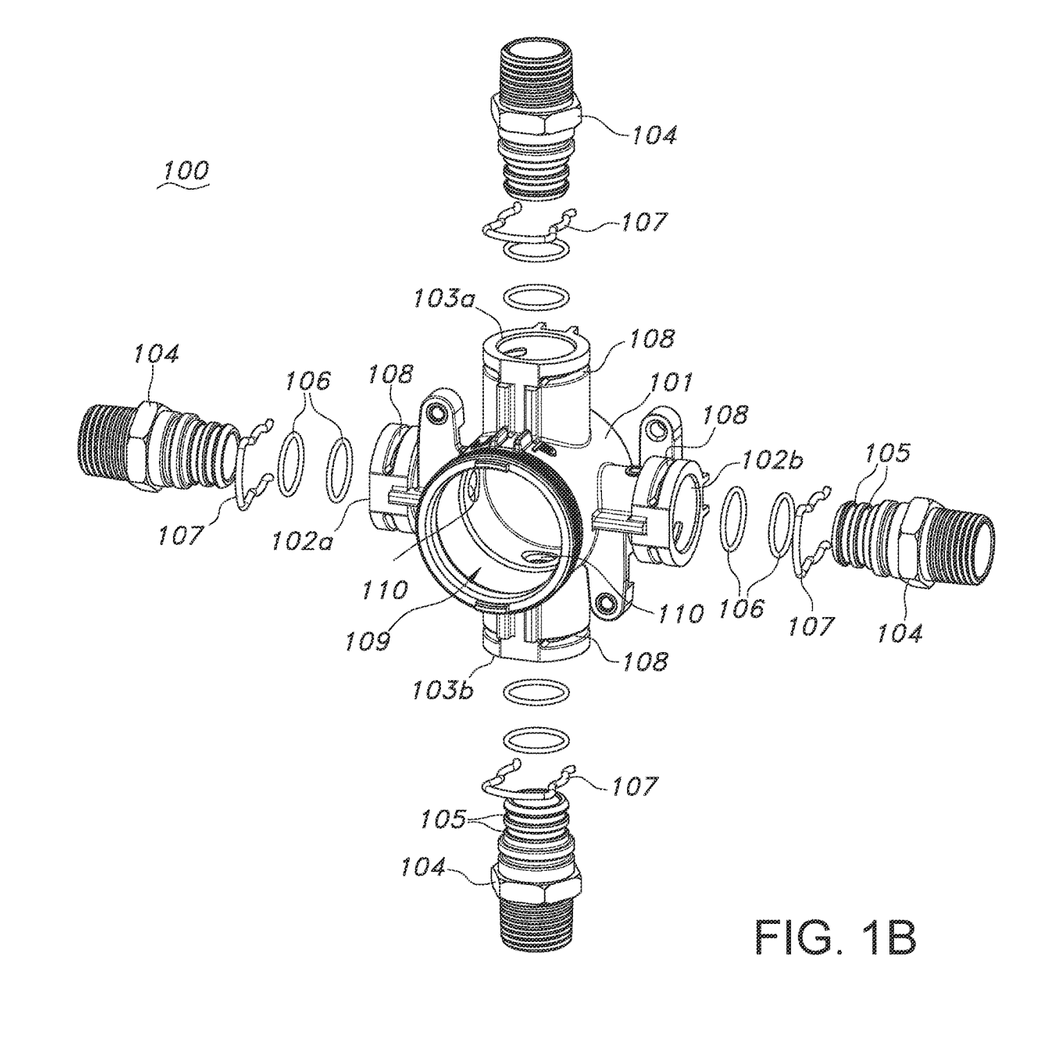

FIG. 1A shows rough-in valve assembly 100, according to an embodiment. FIG. 1B provides an exploded view of rough-in valve assembly 100. Rough-in valve assembly 100 comprises rough-in valve body 101. Rough-in valve body 101 comprises a thermoplastic, for example an injection molded thermoplastic. Thermoplastics may include engineering thermoplastics. Valve body 101 contains first inlet 102a and second inlet 102b. Valve body 101 also contains first outlet 103a and second outlet 103b. First inlet 102a and second inlet 102b are configured to be fluidly connected to a hot water supply and a cold water supply, respectively, via brass nipple connectors 104. First outlet 103a and second outlet 103b are each configured to be fluidly connected to a plumbing fitting, for example a shower head and a tub spout, respectively, via brass nipple connectors 104.

Brass nipple connectors 104 comprise grooves 105 to receive O-rings 106. Inlets 102a and 102b and outlets 103a and 103b comprise a smooth inner surface configured to receive and mate with O-rings 106 to form a seal. Inlets 102a and 102b, and outlets 103a and 103b comprise slots 108, through which U-clips 107 are configured to couple to connectors 104. This connection assembly provides brass nipple connectors freedom to swivel for ease of attachment to for example PEX (cross-linked polyethylene) pipe or tubing. This connection assembly also provides for an ability of valve body 101 to couple to a variety of different nipple connectors, for example NPT male connector, straight bar for quick connect, PEX cold expansion connections, PEX crimp connection, elbow fitting with PEX crimp, or cold expansion connection.

Rough-in valve body 101 comprises chamber 109, configured to receive a fluid mixing valve, for instance a pressure balance valve assembly or a thermostatic valve assembly. In some embodiments, valve chamber 109 is configured to receive a manifold, which manifold is configured to receive a fluid mixing valve cartridge, for example a pressure balance valve cartridge or a thermostatic valve cartridge. Each valve body inlet 102a and 102b, and each valve body outlet 103a and 103b, are in fluid communication with valve chamber 109 via openings 110 (two openings 110 not visible).

Figure 2A:
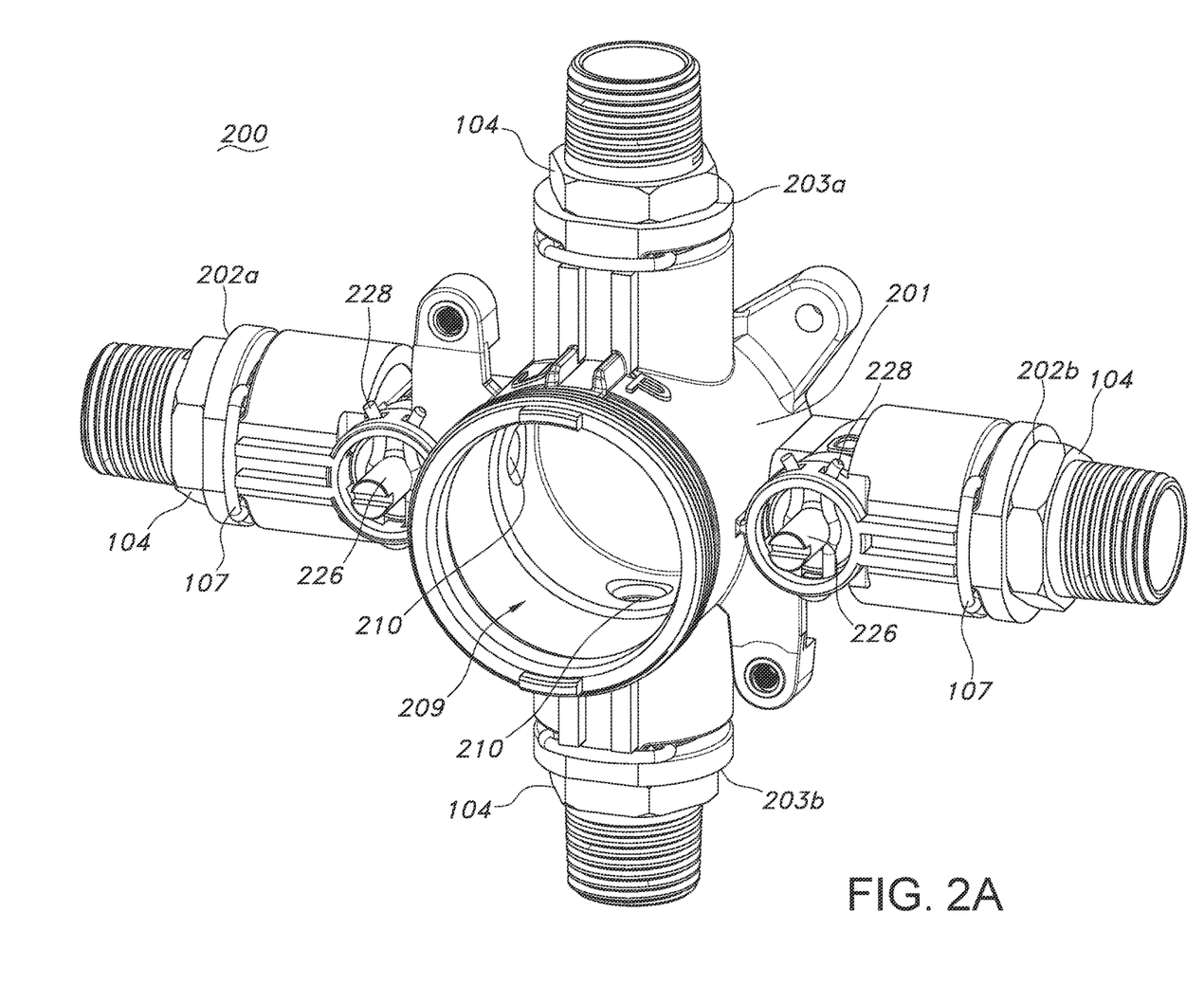
FIG. 2A, FIG. 2B, and FIG. 2C show a rough-in valve assembly, according to some embodiments.
Figure 2B:
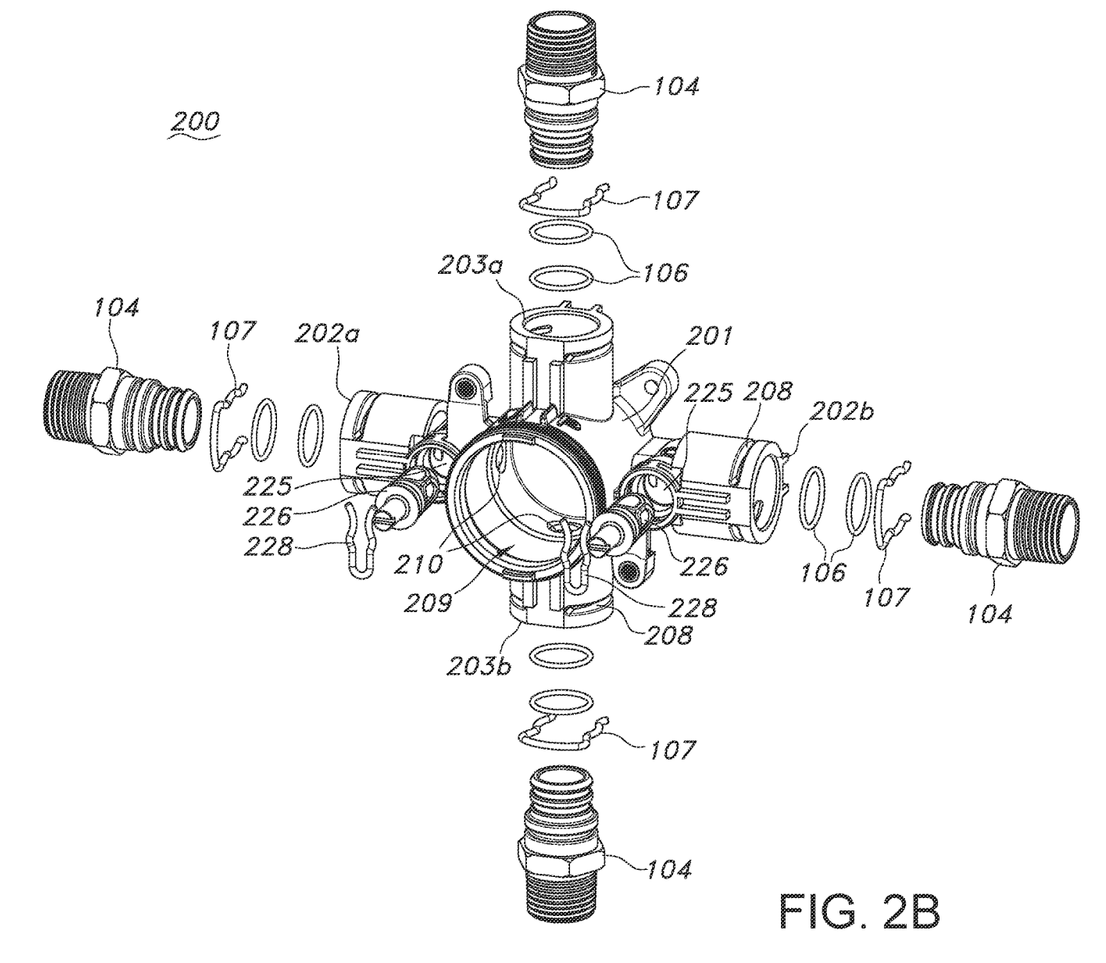
Figure 2C:
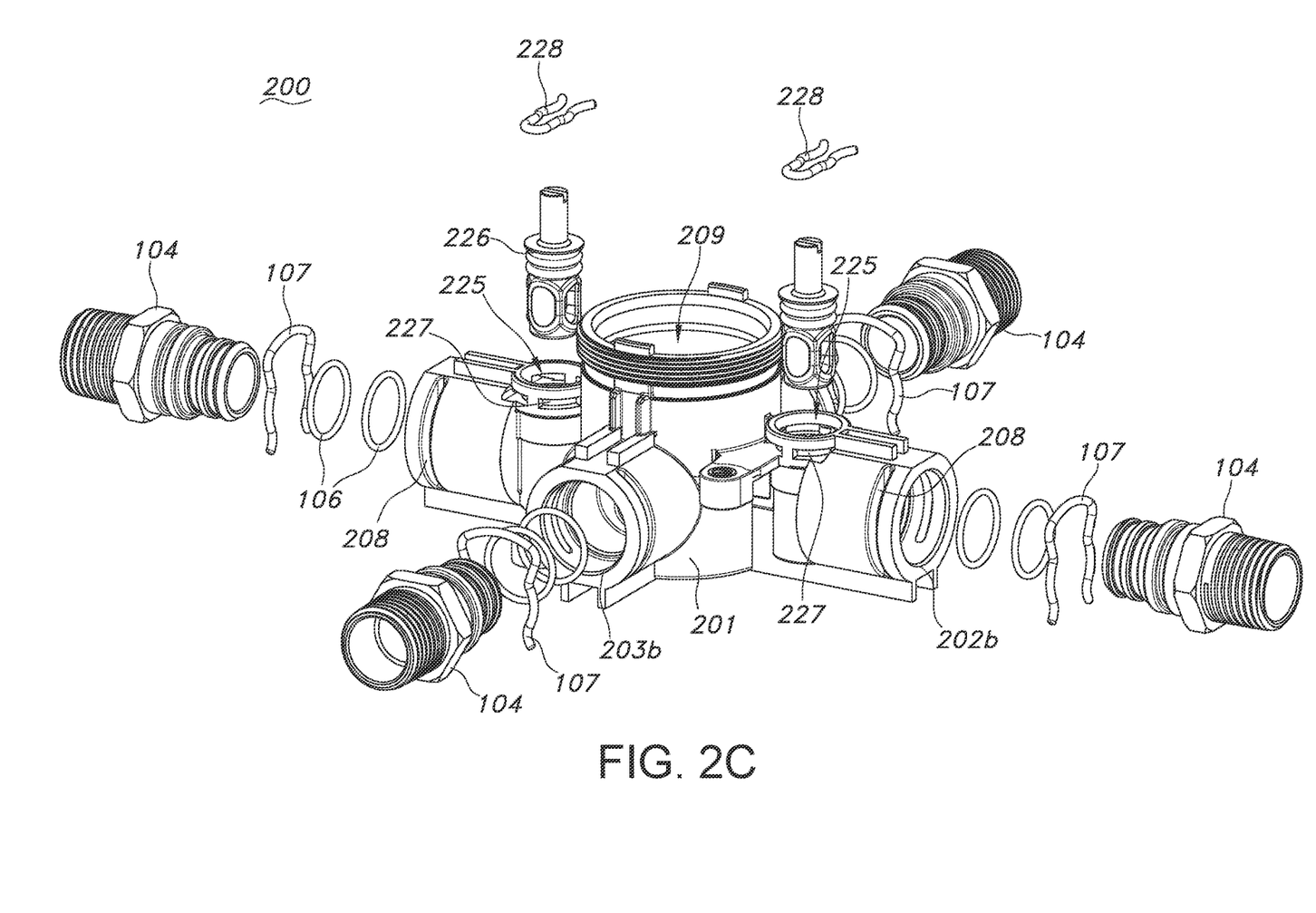

FIG. 2A shows rough-in valve assembly 200, according to an embodiment. FIG. 2B provides an exploded view of rough-in valve assembly 200. FIG. 2C provides an exploded, perspective view of rough-in valve assembly 200, according to an embodiment. Rough-in valve assembly 200 comprises rough-in valve body 201. Rough-in valve body 201 comprises an injection molded thermoplastic. Valve body 201 contains first inlet 202a and second inlet 202b, and first outlet 203a and second outlet 203b. First inlet 202a and second inlet 202b are configured to be fluidly coupled to a hot water supply and a cold water supply, respectively, by brass nipple adapters 104. First outlet 203a and second outlet 203b are each configured to be fluidly connected to a plumbing fitting, for example a shower head and a tub spout, respectively, via brass nipple connectors 104. Rough-in valve body 201 comprises valve chamber 209, configured to receive a fluid mixing valve assembly. In some embodiments, valve chamber 209 is configured to receive a manifold, which manifold is configured to receive a fluid mixing valve cartridge. Valve body inlets 202a and 202b, and valve body outlets 203a and 203b, are in fluid communication with valve chamber via openings 210 (two openings 210 not visible).

Valve body 201 contains openings 225 (FIG. 2B and FIG. 2C) configured to receive service stops 226. Openings 225 comprise slots 227, configured to receive U-clips 228, which serve to couple service stops 226 in openings 225. U-clips 228 may function in a same fashion as U-clips 107, to couple a member to a valve body opening. In some embodiments, U-clips 107 and 228 may comprise stainless steel. Valve body 201 comprises slot-shaped apertures 208 configured to receive U-clips 107 to couple to nipple adapters 104.

In some embodiments, a rough-in valve assembly comprises a valve body, wherein the valve body comprises a thermoplastic, the valve body comprises a first fluid inlet, a second fluid inlet, a first fluid outlet, and a second fluid outlet, the valve body comprises a valve chamber configured to receive a fluid mixing valve assembly, and the valve chamber is in fluid communication with the first fluid inlet, the second fluid inlet, the first fluid outlet, and the second fluid outlet.

In some embodiments, rough-in valve body inlets are configured to be fluidly coupled to a hot water source and a cold water source. In some embodiments, rough-in valve body outlets are configured to be fluidly coupled to different plumbing fittings, for example a shower head and tub spout.

In some embodiments, a rough-in valve body outlet may be configured to be fluidly coupled to a diverter. A diverter may be configured to divert fluid flow between a stationary shower head and a hand shower.

In some embodiments, a rough-in valve body comprises an injection molded thermoplastic. In some embodiments, a rough-in valve body comprises an engineering thermoplastic. In some embodiments, a rough-in valve body may comprise an engineering thermoplastic. Engineering thermoplastics include for example polyamides, polyesters, polycarbonates, acrylonitrile-butadiene-styrene, and polyacetals. Polyamides include nylon and polyphthalamide (PPA). Polyacetals include polyoxymethylene (POM).

In some embodiments, a rough-in valve body fluid inlets and fluid outlets comprise an inner surface configured to receive and couple to a nipple adapter. A nipple adapter may comprise brass. Rough-in valve body fluid inlets and outlets may comprise a smooth inner surface, having a high degree of uniformity as prepared by thermoplastic molding techniques. Nipple adapters may comprise one or more grooves to receive O-rings, which O-rings may be configured to form a seal with a rough-in valve body inlet or outlet inner surface.

In some embodiments, rough-in valve body inlets and outlets may comprise one or more openings, or apertures, configured to receive a fastener to couple to a nipple connector and to affix the nipple connector to the valve body inlet or outlet. In some embodiments, the apertures may be slot-shaped. In some embodiments, a valve body inlet or outlet may comprise two opposing slot-shaped apertures to receive a U-clip configured to couple a nipple adapter to a valve body inlet or outlet.

In some embodiments, a nipple connector or adapter may comprise a metal, for instance brass, zinc, or stainless steel. In some embodiments, a U-clip may comprise a metal or a thermoplastic, for example stainless steel or polyamide.

In some embodiments, nipple adapters coupled to a rough-in valve body are configured to have freedom to swivel, or rotate in either direction, relative to a rough-in valve body inlet or outlet. Such freedom of rotation may provide for ease of attachment to tubing or a pipe.

In some embodiments, a rough-in valve body may comprise one or more openings, for example two openings, each configured to receive a service stop. Rough-in valve openings configured to receive a service stop may also comprise one or more apertures configured to receive a fastener, wherein the fastener is configured to couple a service stop to the opening. A fastener configured to affix a service stop to a valve body opening may be a U-clip. In some embodiments, the apertures are slot-shaped. Rough-in valve openings configured to receive a service stop may comprise two opposing slot-shaped apertures.

In some embodiments, a rough-in valve body first fluid inlet and second fluid inlet are coaxial. In some embodiments, a rough-in valve body first fluid outlet and second fluid outlet are coaxial. In some embodiments, a rough-in valve body first and second inlets comprise a central axis. In some embodiments, a rough-in valve body first and second outlets comprise a central axis. In some embodiments, a rough-in valve body inlet central axis and outlet central axis may be perpendicular, and may intersect within a valve body chamber.

In some embodiments, a fluid mixing valve assembly configured to be positioned in a rough-in valve chamber comprises a pressure balance valve or a thermostatic valve. In some embodiments, a manifold is configured to be positioned in a rough-in valve chamber. A manifold may comprise a chamber to receive a fluid mixing valve, for example a pressure balance valve or a thermostatic valve.

A manifold may be fluidly coupled to a fluid mixing valve and a rough-in valve. A manifold may comprise a first manifold inlet, a second manifold inlet, and an outlet passageway comprising a first manifold outlet and a second manifold outlet. In some embodiments, a manifold outlet passageway may comprise a central portion having a smaller cross-sectional diameter than at least one of a first manifold outlet and a second manifold outlet. In some embodiments, a manifold outlet passageway may comprise a venturi positioned therein.

In some embodiments, a first manifold inlet is co-axial with a first rough-in valve inlet, and a second manifold inlet is co-axial with a second rough-in valve inlet. In some embodiments, a first manifold outlet is coaxial with a first rough-in valve outlet and a second manifold outlet is coaxial with a second rough-in valve outlet. A manifold may comprise a thermoplastic, for instance an engineering thermoplastic.

Following are some non-limiting embodiments of the disclosure.

In a first embodiment, disclosed is a rough-in valve assembly comprising a valve body, wherein the valve body comprises a thermoplastic, the valve body comprises a first fluid inlet, a second fluid inlet, a first fluid outlet, and a second fluid outlet, the valve body comprises a valve chamber configured to receive a fluid mixing valve assembly, and the valve chamber is in fluid communication with the first fluid inlet, the second fluid inlet, the first fluid outlet, and the second fluid outlet.

In a second embodiment, disclosed is a rough-in valve assembly according to the first embodiment, wherein the valve body comprises an injection molded thermoplastic. In a third embodiment, disclosed is a rough-in valve assembly according to embodiments 1 or 2, wherein the valve body comprises an engineering thermoplastic, for example an engineering thermoplastic selected from polyamides, polyesters, polycarbonates, acrylonitrile-butadiene-styrene, and polyacetals.

In a fourth embodiment, disclosed is a rough-in valve assembly according to any of the preceding embodiments, wherein the first fluid inlet, the second fluid inlet, the first fluid outlet, and the second fluid outlet each comprise an inner surface configured to receive and couple to a nipple adapter, for example a brass nipple adapter. In a fifth embodiment, disclosed is a rough-in valve assembly according to any of the preceding embodiments, wherein the first fluid inlet, the second fluid inlet, the first fluid outlet, and the second fluid outlet each comprise one or more apertures configured to receive a fastener configured to couple to a nipple adapter. In a sixth embodiment, disclosed is a rough-in valve assembly according to any of the preceding embodiments, wherein the first fluid inlet, the second fluid inlet, the first fluid outlet, and the second fluid outlet each comprise one or more slot-shaped apertures configured to receive a U-clip fastener configured to couple to a nipple adapter. In a seventh embodiment, disclosed is a rough-in valve assembly according to any of embodiments 4 to 6, wherein the nipple adapters are configured to swivel relative to the valve body.

In an eighth embodiment, disclosed is a rough-in valve assembly according to any of the preceding embodiments, wherein the valve body comprises one or more openings configured to receive and couple to a service stop. In a ninth embodiment, disclosed is a rough-in valve assembly according to any of the preceding embodiments, wherein the valve body comprises one or more openings configured to receive and couple to a service stop, and wherein the one or more openings comprise one or more apertures configured to receive a fastener configured to couple to a service stop. In a tenth embodiment, disclosed is a rough-in valve assembly according to any of the preceding embodiments, wherein the valve body comprises one or more openings configured to receive and couple to a service stop, and wherein the one or more openings comprise one or more slot-shaped apertures configured to receive a U-clip fastener configured to couple to a service stop.

In an eleventh embodiment, disclosed is a rough-in valve assembly according to any of the preceding embodiments, wherein the first fluid inlet and the second fluid inlet are coaxial. In a twelfth embodiment, disclosed is a rough-in valve assembly according to any of the preceding embodiments, wherein the first fluid outlet and the second fluid outlet are coaxial. In a thirteenth embodiment, disclosed is a rough-in valve assembly according to any of the preceding embodiments, wherein the first fluid inlet and the second fluid inlet share a central inlet axis, the first fluid outlet and the second fluid outlet share a central outlet axis, and the central inlet axis and the central outlet axis are perpendicular. In a fourteenth embodiment, disclosed is a rough-in valve assembly according to embodiment 13, wherein the central inlet axis and the central outlet axis intersect within the valve chamber.

In a fifteenth embodiment, disclosed is a rough-in valve assembly according to any of the preceding embodiments, wherein the fluid mixing valve assembly comprises a pressure balance valve or a thermostatic valve. In a sixteenth embodiment, disclosed is a rough-in valve assembly according to any of the preceding embodiments, wherein the fluid mixing valve assembly comprises a manifold having a manifold chamber configured to receive a fluid mixing valve. In a seventeenth embodiment, disclosed is a rough-in valve assembly according to any of the preceding embodiments, comprising a fluid mixing valve assembly positioned in the valve chamber. In an eighteenth embodiment, disclosed is a rough-in valve assembly according to any of the preceding embodiments, wherein the fluid mixing valve assembly comprises a fluid mixing valve disposed in a manifold chamber.

In a nineteenth embodiment, disclosed is a rough-in valve assembly according to any of the preceding embodiments, comprising a nipple adapter positioned in and coupled to one or more of the first fluid inlet, the second fluid inlet, the first fluid outlet, or the second fluid outlet. In a twentieth embodiment, disclosed is a rough-in valve assembly according to any of the preceding embodiments, comprising a service stop positioned in and coupled to one or more openings of the valve body.

The term "flow communication" or "fluid communication" means for example configured for liquid or gas flow therethrough and may be synonymous with "fluidly coupled". The terms "upstream" and "downstream" indicate a direction of gas or fluid flow, that is, gas or fluid will flow from upstream to downstream.

Likewise, "electrical communication" may mean "electrically coupled". Electrical communication may be via wired connection or may be wireless.

The terms "coupled" or "connected" may mean that an element is "attached to" or "associated with" another element. Coupled or connected may mean directly coupled or coupled through one or more other elements. An element may be coupled to an element through two or more other elements in a sequential manner or a non-sequential manner.

The term "via" in reference to "via an element" may mean "through" or "by" an element. Coupled or connected or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, or ±10%. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, or ±10% of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A rough-in valve assembly comprising a valve body, wherein
   the valve body comprises a thermoplastic,
   the valve body comprises a first fluid inlet, a second fluid inlet, a first fluid outlet, and a second fluid outlet,
   the valve body comprises a valve chamber configured to receive a fluid mixing valve assembly, wherein the first fluid inlet, the second fluid inlet, the first fluid outlet, and the second fluid outlet each comprise one or more apertures configured to receive a fastener configured to couple to a nipple adapter, and
   the valve chamber is in fluid communication with the first fluid inlet, the second fluid inlet, the first fluid outlet, and the second fluid outlet.

2. The rough-in valve assembly according to claim 1, wherein the valve body comprises an injection molded thermoplastic.

3. The rough-in valve assembly according to claim 1, wherein the valve body comprises one or more engineering thermoplastics selected from polyamides, polyesters, polycarbonates, acrylonitrile-butadiene-styrene, and polyacetals.

4. The rough-in valve assembly according to claim 1, wherein the first fluid inlet, the second fluid inlet, the first fluid outlet, and the second fluid outlet each comprise an inner surface configured to receive and couple to a nipple adapter.

5. The rough-in valve assembly according to claim 1, wherein the first fluid inlet, the second fluid inlet, the first fluid outlet, and the second fluid outlet each comprise one or more slot-shaped apertures configured to receive a U-clip fastener configured to couple to a nipple adapter.

6. The rough-in valve assembly according to claim 4, wherein the nipple adapter is configured to swivel relative to the valve body.

7. The rough-in valve assembly according to claim 1, wherein the valve body comprises one or more openings configured to receive and couple to a service stop.

8. The rough-in valve assembly according to claim 1, wherein the valve body comprises one or more openings configured to receive and couple to a service stop, and wherein the one or more openings comprise one or more apertures configured to receive a fastener configured to couple to the service stop.

9. The rough-in valve assembly according to claim 1, wherein the valve body comprises one or more openings configured to receive and couple to a service stop, and wherein the one or more openings comprise one or more slot-shaped apertures configured to receive a U-clip fastener configured to couple to the service stop.

10. The rough-in valve assembly according to claim 1, wherein the first fluid inlet and the second fluid inlet are coaxial.

11. The rough-in valve assembly according to claim 1, wherein the first fluid outlet and the second fluid outlet are coaxial.

12. The rough-in valve assembly according to claim 1, wherein the first fluid inlet and the second fluid inlet share a central inlet axis, the first fluid outlet and the second fluid outlet share a central outlet axis, and the central inlet axis and the central outlet axis are perpendicular.

13. The rough-in valve assembly according to claim 12, wherein the central inlet axis and the central outlet axis intersect within the valve chamber.

14. The rough-in valve assembly according to claim 1, wherein the fluid mixing valve assembly comprises a pressure balance valve or a thermostatic valve.

15. The rough-in valve assembly according to claim 1, wherein the fluid mixing valve assembly comprises a manifold having a manifold chamber configured to receive a fluid mixing valve.

16. The rough-in valve assembly according to claim 1, comprising a fluid mixing valve assembly positioned in the valve chamber.

17. The rough-in valve assembly according to claim 15, wherein the fluid mixing valve assembly comprises the fluid mixing valve disposed in the manifold chamber.

18. The rough-in valve assembly according to claim 1, comprising a nipple adapter positioned in and coupled to one or more of the first fluid inlet, the second fluid inlet, the first fluid outlet, or the second fluid outlet.

19. The rough-in valve assembly according to claim 1, comprising a service stop positioned in and coupled to one or more openings of the valve body.

* * * * *